UNITED STATES PATENT OFFICE.

PHILIP THORPE, OF NEW YORK, N. Y.

MODE OF PREPARING EGG-SIRUP.

SPECIFICATION forming part of Letters Patent No. 433,832, dated August 5, 1890.

Application filed June 12, 1889. Serial No. 314,067. (Specimens.)

*To all whom it may concern:*

Be it known that I, PHILIP THORPE, a citizen of the United States, residing at New York city, in the county of New York and State of New York, have invented certain new and useful Improvements in Preparing Egg-Sirup for Cooking and other Purposes, of which the following is a specification.

My invention relates to a sirup or composition of matter, of which the essential ingredients are sirup of any desired kind, eggs, and bicarbonate of soda; and the invention consists in a novel method of preparing or compounding the same, whereby a sirup is produced which may be kept for a great length of time without deterioration in quality.

The preparation is designed, primarily, to preserve the eggs which enter into its composition, and, secondarily, to facilitate the making of cake and other articles of food by insuring accuracy of proportion and thoroughness of intermixture, even where careless or unskilled persons are relied upon to make such articles.

The difficulty of preserving eggs in a perfectly-fresh condition for a considerable length of time is well understood, and the unsatisfactory results attained by packing them in lime, and, in fact, by nearly or quite all known methods of preservation in the shell, are of common knowledge.

For many purposes it is entirely unnecessary to preserve the eggs in their natural condition, inasmuch as they will in any event be mixed with other matters when used, and certain of these other matters being capable of preserving the eggs fresh and sweet, it follows that if all be mixed and made into a sirup the eggs may be preserved indefinitely and the preparation kept in stock and on sale as a regular article of trade. In this way a great share of the loss now incident to the attempt to preserve eggs in their shells may be obviated, and the work and care of accurately measuring and intimately mixing the several ingredients are taken away from cooks and domestics, and is done with accuracy, ease, and expedition by manufacturers having facilities for operating on a large scale.

The advantage of being able to keep eggs in condition for such uses for a long time, and the further gain due to the fact that the preparation may be put up during those portions of the year when eggs are plentiful and cheap, render my invention of very considerable importance.

The proportions may be somewhat varied without departing from the spirit of my invention, and the appearance will vary according to the proportions adopted and the character of the sirup employed.

The composition is prepared in the following manner, and preferably in the proportions given: To one gallon of pure water add fourteen pounds of pure lump or loaf sugar and boil for about an hour, or until the whole is reduced to a sirup. Ninety-six eggs are removed from their shells and thoroughly beaten and gradually stirred into the sirup, which is previously allowed to cool somewhat or to come to a lukewarm state. While adding the eggs to the sirup the mass is thorougly stirred or agitated, to insure perfect commingling of the ingredients, and then three ounces of bicarbonate of soda are added and well stirred into the mixture. This done, the mixture is again placed over the fire and brought to the boiling-point, being thoroughly stirred or agitated while being heated. When the boiling-point is reached, the mixture is removed from over the fire, and while still hot is strained through a fine sieve or cloth, after which it is allowed to cool, and is bottled or put up for use and sale. It is important that the mass be well stirred or agitated from first to last to insure intimate commingling of the ingredients and to prevent scorching or burning. It is obvious that the proportions may be varied to a considerable extent without materially changing the character of the preparation, and that more or less sugar or other saccharine matter and a greater or smaller number of eggs or a larger or smaller quantity of bicarbonate of soda may be used, these variations depending somewhat upon the character of the food preparations in the manufacture of which the mixture is to be used and upon the taste of the purchaser. Different gradations may be adopted and the preparation marked accordingly, so as to meet the requirements of the trade, and this without departing from the scope or spirit of my invention.

The mode of preparation above set forth not only insures a much more perfect commingling of the several ingredients, by reason of the employment of heat, the thorough agitation, and the mixing of the sirup, eggs, and soda apart from flour or other absorbent matter, but it also materially lessens the labor and shortens the time of the cook, because the prepared sirup can be at once stirred into the flour, butter, &c., used in cake-making. By carefully straining the mixture all lumps and impurities are removed, and the embryo of the egg, if not destroyed by the heat, will likewise be taken out.

I am aware that each of the ingredients named has been before used in food preparations—that is to say, soda has been used in some, eggs in others, sugar in others, and several of these ingredients in other preparations. I am not aware, however, of any prior composition comprising all of said ingredients without the addition and admixture of flour or flour and other matters, which addition would destroy the characteristic features of my sirup and defeat the object of my invention. Neither am I aware that any one has ever before compounded the several ingredients named in the manner above set forth, subject to heat and agitation, nor that an egg-sirup capable of being preserved for a long time in a fresh and pure state has ever before been proposed.

While I have referred to the preparation as more particularly intended for cooking purposes, it is to be understood that it is capable of varied application—as, for instance, in the preparation of medical compounds. So, too, while I have named bicarbonate of soda, it is of course to be understood that any substance now known and recognized as the equivalent of bicarbonate of soda in such preparations—as, for instance, bicarbonate of potash, (saleratus,)—may be substituted therefor, and that the claim is intended to include such equivalents.

Having thus described my invention, what I claim is—

The herein-described method of producing an egg-sirup, which consists in dissolving sugar or saccharine matter in water subject to heat and agitation, beating eggs together apart from the sugar and water, stirring the beaten eggs into the sirup, adding bicarbonate of soda or its equivalent, and finally heating the entire mass to or about to the boiling-point.

In witness whereof I hereunto set my hand in the presence of two witnesses.

PHILIP THORPE.

Witnesses:
RUSH F. SIMMS,
J. H. SIMMS.